US012766535B2

(12) United States Patent
Lee

(10) Patent No.: US 12,766,535 B2
(45) Date of Patent: Oct. 20, 2026

(54) PUMP CAP FOR DOUBLE CONTAINER

(71) Applicant: ELCOS CO., LTD, Hwaseong-si (KR)

(72) Inventor: Eun Suk Lee, Incheon (KR)

( * ) Notice: Subject to any disclaimer, the term of this patent is extended or adjusted under 35 U.S.C. 154(b) by 120 days.

(21) Appl. No.: 19/015,037

(22) Filed: Jan. 9, 2025

(65) Prior Publication Data

US 2025/0222476 A1 Jul. 10, 2025

(30) Foreign Application Priority Data

Jan. 10, 2024 (KR) ........................ 10-2024-0004080

(51) Int. Cl.
*B05B 11/10* (2023.01)
*B65D 77/04* (2006.01)

(52) U.S. Cl.
CPC ...... *B05B 11/1047* (2023.01); *B05B 11/1001* (2023.01); *B65D 77/0486* (2013.01)

(58) Field of Classification Search
CPC ............ B05B 11/1047; B05B 11/1001; B65D 77/0486
USPC .......................................................... 222/401
See application file for complete search history.

(56) References Cited

U.S. PATENT DOCUMENTS 8,534,506 B2 * 9/2013 Bohnisch .............. B05B 11/028 222/105
11,707,754 B2 * 7/2023 Lee ........................ A45D 34/00 222/401
12,053,074 B2 * 8/2024 Kim .................... B05B 11/0013
2023/0022130 A1 * 1/2023 Lee ........................ A45D 34/00
(Continued)

FOREIGN PATENT DOCUMENTS

JP 2019051981 A * 4/2019
KR 20-2012-0004976 U 7/2012
(Continued)

*Primary Examiner* — Paul R Durand
*Assistant Examiner* — Michael J. Melaragno

(57) ABSTRACT

The present invention relates to a pump cap for a double container, which can improve the convenience of replacement when refilling an inner container by combining a pump cap with a general inner container. The present invention provides, as its technical idea, a pump cap for a double container, which includes an outer container having an outer neck part, an inner container accommodated inside the outer container through the outer neck part of the outer container and having an inner neck part, a pump cap detachably fitted into the inner neck part of the inner container, a discharge pump coupled to the pump cap and having a piston housing for discharging liquid contents stored in the inner container, and a container cap for fixing the discharge pump and the inner container to the outer container, characterized in that the pump cap includes a guide bushing detachably fitted into inner circumference of the inner neck part of the inner container so as to guide coupling of the piston housing, a coupling sleeve spaced apart from outer diameter of the guide bushing at a predetermined interval so as to be detachably coupled to outer circumference of the inner neck part of the inner container, a cap flange for connecting the coupling sleeve and an upper end of the guide bushing, and a shoulder brim extending along periphery of the cap flange so as to be placed on an upper end of the outer neck part of the outer container.

3 Claims, 6 Drawing Sheets

(56) References Cited

U.S. PATENT DOCUMENTS

| | | | | |
|---|---|---|---|---|
| 2025/0205721 | A1* | 6/2025 | Lee | B05B 11/1074 |
| 2025/0222476 | A1* | 7/2025 | Lee | B65D 77/0486 |

FOREIGN PATENT DOCUMENTS

| | | | | |
|---|---|---|---|---|
| KR | 10-2473311 B1 | 12/2022 | | |
| WO | WO-2021125513 A1 * | 6/2021 | | B05B 11/0097 |

* cited by examiner

PUMP CAP FOR DOUBLE CONTAINER

CROSS-REFERENCE TO RELATED APPLICATION

This application claims the benefit of and priority to Korean Patent Application No. 10-2024-0004080 filed on Jan. 10, 2024, which are herein incorporated by reference in its entirety.

TECHNICAL FIELD

The present invention relates to a pump cap for a double container, which enables refilling, and more specifically to, a pump cap for a double container, which can improve the convenience of replacement when refilling an inner container by combining a pump cap with a general inner container.

TECHNICAL BACKGROUND

As is well-known, a double container includes an inner container and an outer container, and the inner container is fastened to a pump cap combined with a shoulder in a screw-coupling manner.

As prior art related to such double containers, Korean Utility Model Publication No. 20-2012-0004976 (published on Jul. 10, 2012) entitled 'Pumping dispenser for liquid bottle' and Korean Patent Registration No. 10-2473311 (registered on Nov. 29, 2022) entitled 'Cosmetic container' have been disclosed.

However, the above-mentioned prior art had a problem in that replacement process was inconvenient when refilling because the inner container was separated and replaced by turning the pump cap which was coupled with a container cap.

In addition, the above-mentioned prior art had a problem in that an additional sealing paper or inner container lid had to be used to seal an inner refill container and then the container had to be disposed of, causing environmental pollution.

Furthermore, the above-mentioned prior art had a problem in that the process of removing a sealing paper was inconvenient because the sealing paper that sealed a new inner container or pump cap had to be removed by grasping it with the fingertips or fingernails or by using a tool such as a knife.

DETAILED DESCRIPTION OF THE INVENTION

Technical Problems

The present invention has a purpose to provide a pump cap for a double container, which can be easily combined with an inner container so as to improve the convenience of replacement and to enable easy removal of a sealing part.

Summary of Invention

The present invention for achieving the above purpose has a technical idea of providing a pump cap for a double container, which includes an outer container having an outer neck part, an inner container accommodated inside the outer container through the outer neck part of the outer container and having an inner neck part, a pump cap detachably fitted into the inner neck part of the inner container, a discharge pump coupled to the pump cap and having a piston housing for discharging liquid contents stored in the inner container, and a container cap for fixing the discharge pump and the inner container to the outer container, characterized in that the pump cap includes a guide bushing detachably fitted into inner circumference of the inner neck part of the inner container so as to guide coupling of the piston housing, a coupling sleeve spaced apart from outer diameter of the guide bushing at a predetermined interval so as to be detachably coupled to outer circumference of the inner neck part of the inner container, a cap flange for connecting the coupling sleeve and an upper end of the guide bushing, and a shoulder brim extending along periphery of the cap flange so as to be placed on an upper end of the outer neck part of the outer container.

The discharge pump may include the piston housing having a disc coupled to inner circumference of the guide bushing so as to control flow of the liquid contents stored in the inner container, a pump piston coupled to inner circumference of the piston housing so as to move up and down, a valve coupled to the pump piston so as to discharge the liquid contents introduced through the disc, a push button having a nozzle so as to discharge the liquid contents by pressing the valve, and a spring for restoring the push button.

Herein, a pricker may be provided on a lower surface of the piston housing so as to prick and release a sealing part that seals a lower end of the guide bushing.

A space ring may be provided on edge of a lower surface of the cap flange so as to maintain a coupling gap for inner circumference of the outer neck part of the outer container.

Advantages of Invention

According to the present invention implemented as a solution described above, unlike the prior art, the inner container and the pump cap are not coupled in a screw-coupling manner but in a press-fit manner, so that a user can easily replace the inner container by refilling it with a new one during use, existing commercialized inner container prototypes can be applied in the pressing-fit method during refilling by simply attaching the pump cap, resulting in reduced manufacturing costs and excellent compatibility, and when coupling the discharge pump to the pump cap, the pricker pierces the sealing part at the lower end of the guide bushing so as to release the seal, so it has a very useful effect of improving the convenience of use.

BEST MODE

Figure 1:
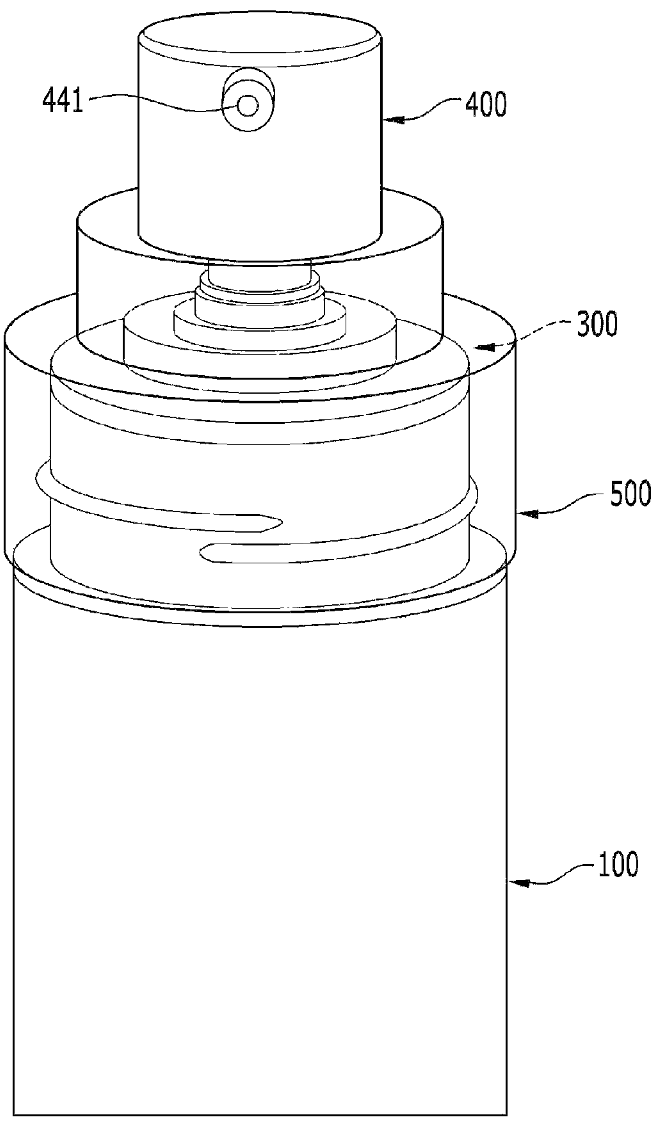
FIG. 1 is a perspective view of a double container according to an embodiment of the present invention.

The embodiments of the present invention may be modified in a variety of forms, and the scope of the present invention should not be construed as being limited to the embodiments described in detail below. The embodiments are provided to more completely explain the present invention to a person having average knowledge in the art.

Accordingly, the shapes or the like of components depicted in the drawings may be exaggerated to emphasize a clearer description. It should be noted that in each drawing, like components are sometimes depicted with like reference numerals. In addition, detailed descriptions of functions and configurations of known technologies that are judged to unnecessarily obscure the gist of the present invention may be omitted.

A pump cap for a double container, which includes an outer container having an outer neck part, an inner container accommodated inside the outer container through the outer neck part of the outer container and having an inner neck part, a pump cap detachably fitted into the inner neck part of the inner container, a discharge pump coupled to the pump cap and having a piston housing for discharging liquid contents stored in the inner container, and a container cap for fixing the discharge pump and the inner container to the outer container, characterized in that the pump cap comprises: a guide bushing detachably fitted into inner circumference of the inner neck part of the inner container so as to guide coupling of the piston housing; a coupling sleeve spaced apart from outer diameter of the guide bushing at a predetermined interval so as to be detachably coupled to outer circumference of the inner neck part of the inner container; a cap flange for connecting the coupling sleeve and an upper end of the guide bushing; and a shoulder brim extending along periphery of the cap flange so as to be placed on an upper end of the outer neck part of the outer container.

In order to fully understand the present invention, preferred embodiments of the present invention will be described below with reference to the accompanying drawings.

The embodiments of the present invention may be modified in a variety of forms, and the scope of the present invention should not be construed as being limited to the embodiments described in detail below. The embodiments are provided to more completely explain the present invention to a person having average knowledge in the art.

Accordingly, the shapes or the like of components depicted in the drawings may be exaggerated to emphasize a clearer description and it should be noted that in each drawing, like components are sometimes depicted with like reference numerals.

In addition, detailed descriptions of functions and configurations of known technologies that are judged to unnecessarily obscure the gist of the present invention may be omitted.

According to an embodiment of the present invention, a pump cap for a double container includes an outer container 100 having an outer neck part 110, an inner container 200 accommodated inside the outer container 100 through the outer neck part 110 of the outer container 100 and having an inner neck part 210, a pump cap 300 detachably fitted into the inner neck part 210 of the inner container 200, a discharge pump 400 coupled to the pump cap 300 and having a piston housing 410 for discharging liquid contents stored in the inner container 200, and a container cap 500 for fixing the discharge pump 400 and the inner container 200 to the outer container 100.

The outer container 100 is formed in a cylindrical shape with an open top portion and an empty interior.

Figure 2:
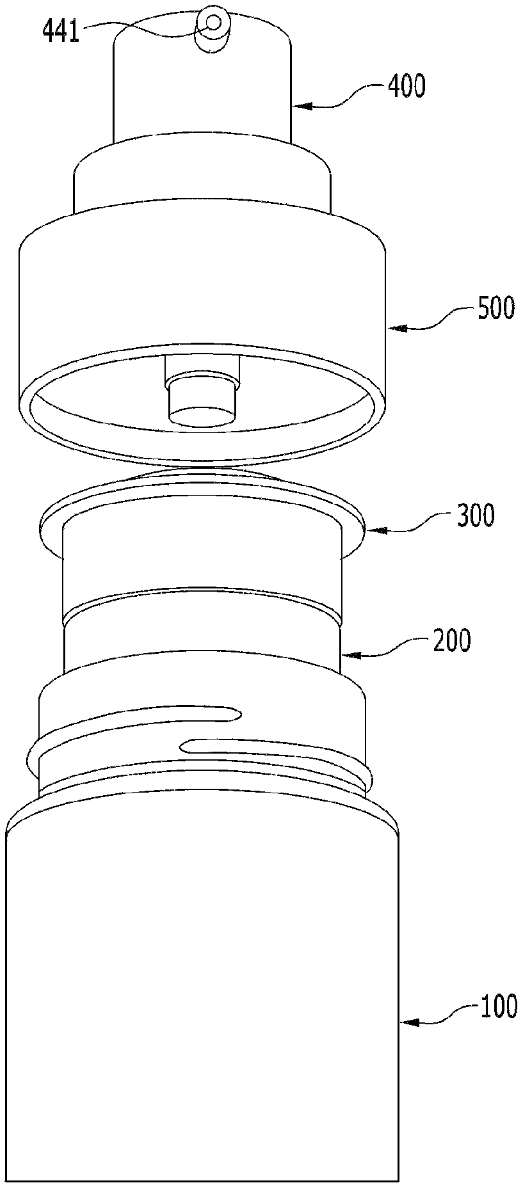
FIG. 2 is an exploded perspective view of a double container according to an embodiment of the present invention.
Figure 3:
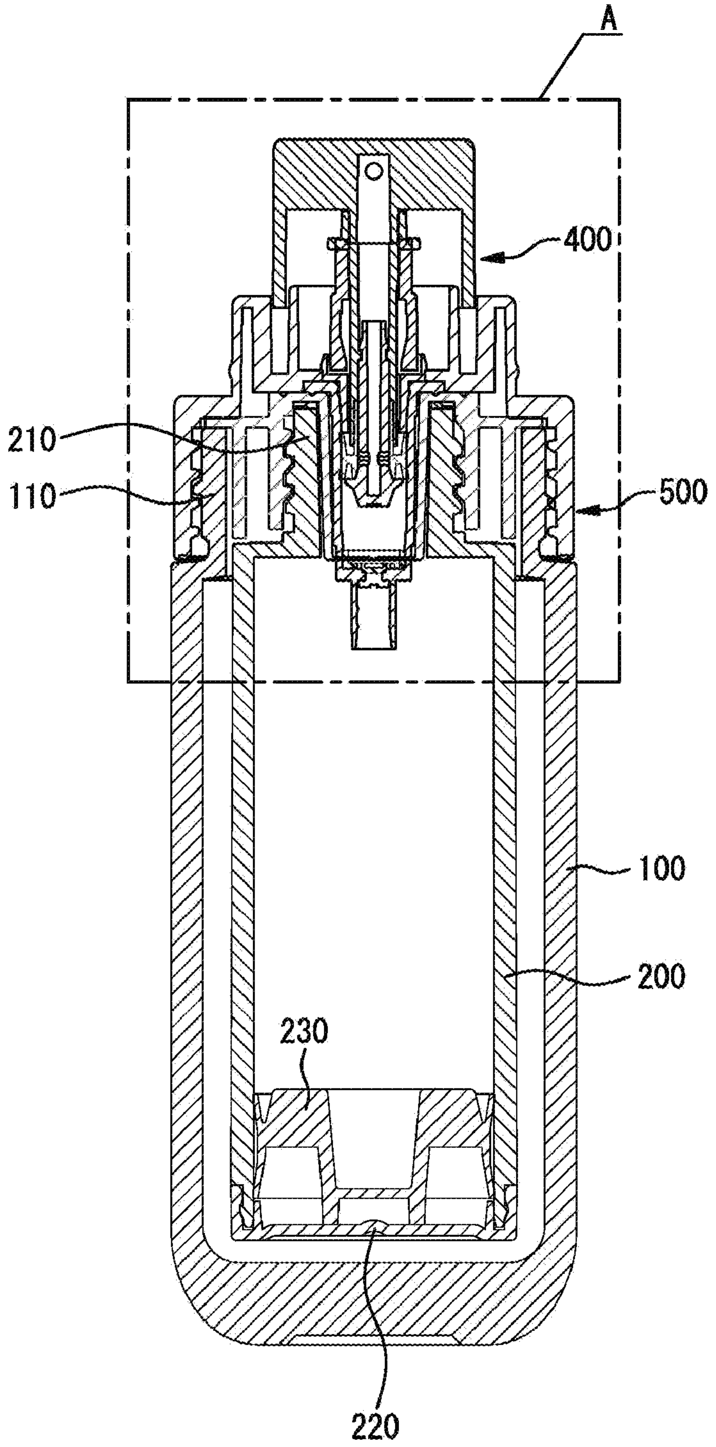
FIG. 3 is a cross-sectional view of a double container according to an embodiment of the present invention.

Referring to FIG. 2 and FIG. 3, the open top of the outer container 100 is provided with an outer neck part 110 having a male screw on an outer circumference, to which a female screw of the container cap 500 is screw-coupled.

The inner container 200 is accommodated inside the outer container 100 through an inner circumference of the outer neck part 110.

Referring to FIG. 2 and FIG. 3, the inner neck part 210 has a male screw on an outer circumference and is provided at an open top portion of the inner container 200, and a base 220 is coupled to a lower surface of the inner container 200.

In addition, a container piston 230 is coupled to a lower end at an inner circumference of the inner container 200 so as to move up and down, wherein the container piston 230 moves up so as to discharge the liquid contents by operation of the discharge pump 400.

The pump cap 300 is detachably fitted to the inner neck part 210 of the inner container 200 so as to improve the convenience of replacement.

Figure 4:
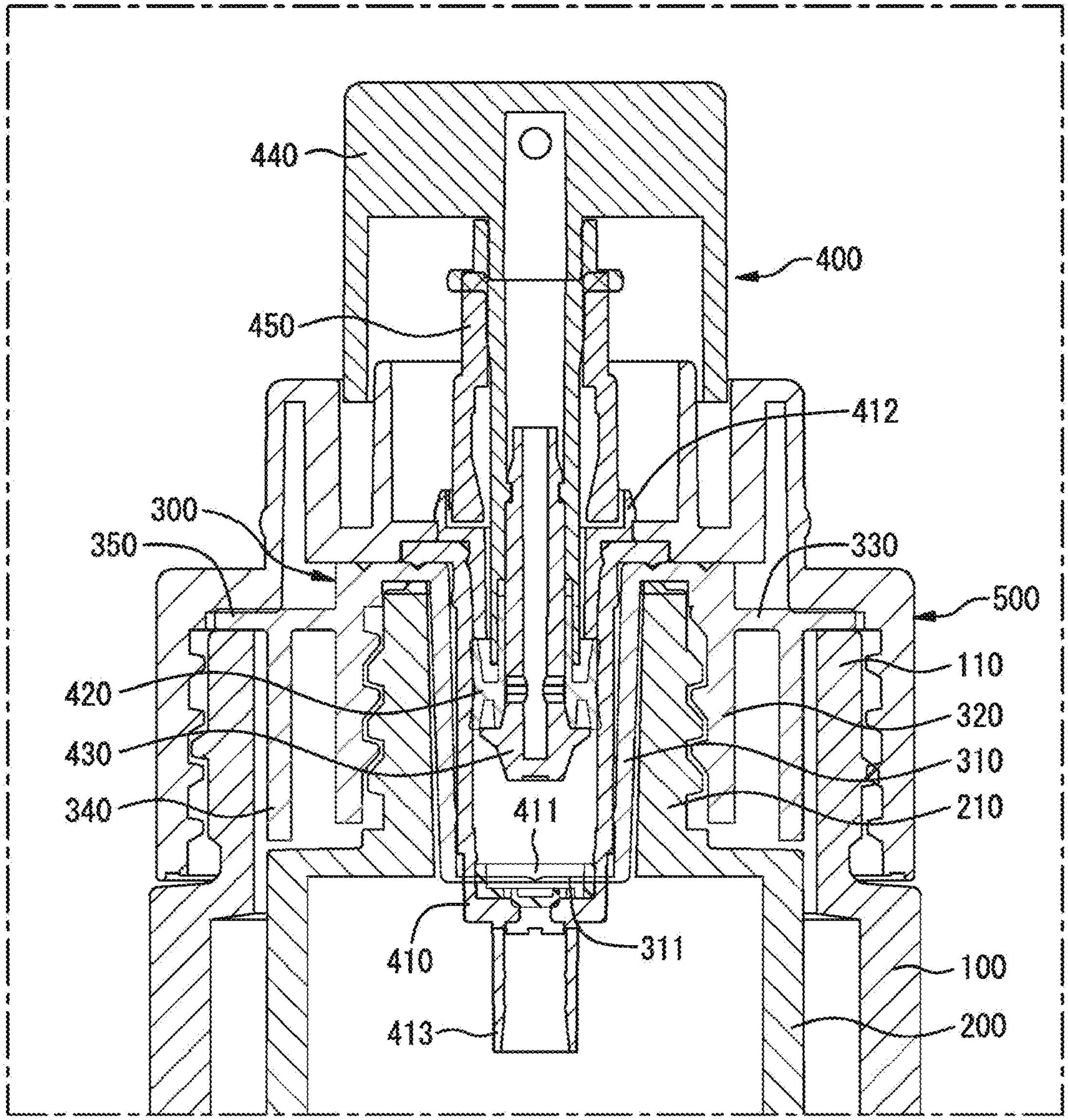
FIG. 4 is an enlarged view of part 'A' of FIG. 3.

Referring to FIG. 4, the pump cap 300 includes a guide bushing 310 detachably fitted into the inner circumference of the inner neck part 210 of the inner container 200 so as to guide coupling of the piston housing 410, a coupling sleeve 320 spaced apart from outer diameter of the guide bushing 310 at a predetermined interval so as to be detachably coupled to the outer circumference of the inner neck part 210 of the inner container 200, a cap flange 330 for connecting the coupling sleeve 320 and an upper end of the guide bushing 310, and a shoulder brim 350 extending along periphery of the cap flange 330 so as to be placed on an upper end of the outer neck part 110 of the outer container 100.

In order to improve the convenience of replacement, the guide bushing 310 has function of being detachably fitted into the inner circumference of the inner neck part 210 and also has the function of guiding the coupling of the piston housing 410. The guide bushing 310 is sealed at bottom with a sealing part 311, wherein the sealing can be released by poking the sealing part 311 with a pricker 413 of the piston housing 410 which will be described later.

Herein, the sealing part 311 is made of a thin and soft material and is formed integrally with the guide bushing 310.

The coupling sleeve 320 is formed in a tubular shape with a diameter larger than that of the guide bushing 310 and is detachably fitted into the outer circumference of the inner neck part 210 of the inner container 200. Optionally, the coupling sleeve 320 may be provided with a female screw on an inner circumference so as to be screw-coupled to the male screw of the inner neck part 210.

The cap flange 330 is formed in a round and flat brim shape and connects the coupling sleeve 320 and the upper end of the guide bushing 310. A circular tubular space ring 340 is connected to an edge of a lower surface of the cap flange 330 and is joined so as to maintain a gap with the inner circumference of the outer neck part 110 of the outer container 100.

The shoulder brim 350 is mounted on the upper end of the outer neck part 110 of the outer container 100, thereby improving the convenience of combining and replacing the pump cap 300.

The discharge pump 400 has the function of discharging the liquid contents stored in the inner container 200.

Referring to FIG. 4, the discharge pump 400 includes the piston housing 410 having a disc 411 coupled to inner circumference of the guide bushing 310 so as to control flow of the liquid contents stored in the inner container 200, a pump piston 420 coupled to inner circumference of the piston housing 410 so as to move up and down, a valve 430 coupled to the pump piston 420 so as to discharge the liquid contents introduced through the disc 411, a push button 440 having a nozzle 441 so as to discharge the liquid contents by pressing the valve 430, and a spring 450 for restoring the push button 440.

The piston housing 410 is provided with a tube-shaped pricker 413 on a lower surface, wherein the tube-shaped pricker 413 has a sharp end for piercing the sealing part 311 of the guide bushing 310 so as to release the seal. A housing cap 412 is coupled to the upper end of the inner circumference of the piston housing 410 and prevents leakage of the liquid contents.

The operation and effect of the pump piston 420, the valve 430, the push button 440, and the spring 450 can be replaced with the conventional technology described above, so the description thereof is omitted.

Now, the operation of the present invention according to the embodiment configured as above will be described in detail with reference to the accompanying drawings as follows.

Figure 5:
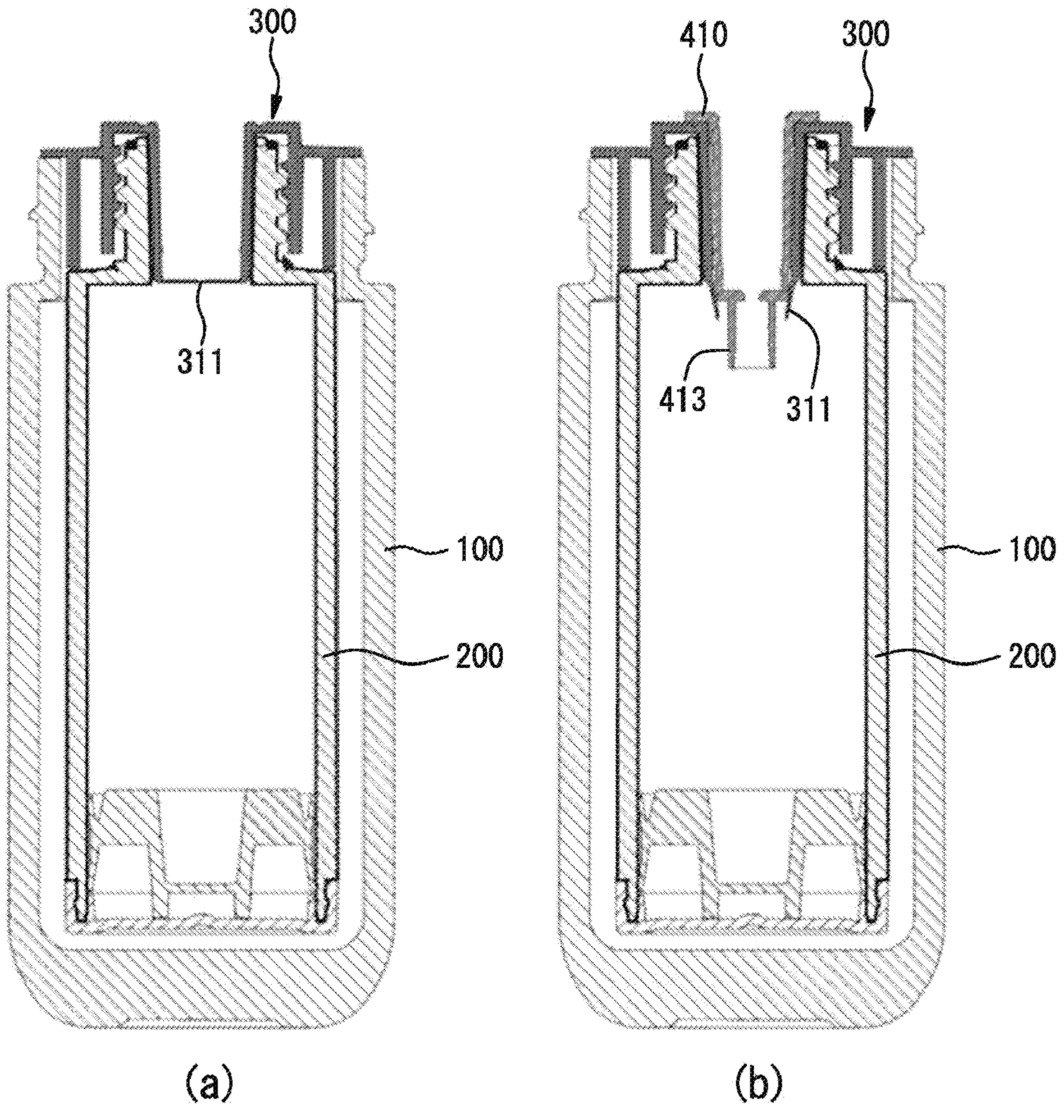
FIG. 5 is a cross-sectional view showing a perforation state of a sealing part according to an embodiment of the present invention.

First, FIG. 5 is a cross-sectional view showing a perforation state of the sealing part 311 according to an embodiment of the present invention, wherein a is a cross-sectional view showing a state in which the shoulder brim 350 of the pump cap 300 coupled to the inner neck part 210 of the inner container 200 is placed on the upper end of the outer neck part 110 of the outer container 100, and b is a cross-sectional view showing a state in which the piston housing 410 is coupled to the guide bushing 310 of the pump cap 300 and the sealing part 311 is pricked with the pricker 413, resulting in the release of the seal.

Next, when the pump cap 300 is fitted and combined into the inner neck part 210 of the inner container 200 and the inner container 200 is inserted into the inner circumference of the outer neck part 110 of the outer container 100, the shoulder brim 350 of the pump cap 300 is placed on the upper end of the outer neck part 110 of the outer container 100 as shown in a of FIG. 5.

Then, as the piston housing 410 of the discharge pump 400 is coupled to the inner circumference of the guide bushing 310, the pricker 413 pierces the sealing part 311, thereby releasing the seal, as shown in b of FIG. 5.

Therefore, according to the embodiment of the present invention described above, unlike the prior art described above, the inner container 200 and the pump cap 300 are joined by press-fit rather than screw-coupling, so there is an advantage in that the inner container 200 can be easily replaced.

In addition, according to the embodiment of the present invention described above, when the discharge pump 400 is coupled to the pump cap 300, the pricker 413 pierces the sealing part 311 to release the seal, so there is an advantage in that the convenience of use can be improved.

Figure 6:
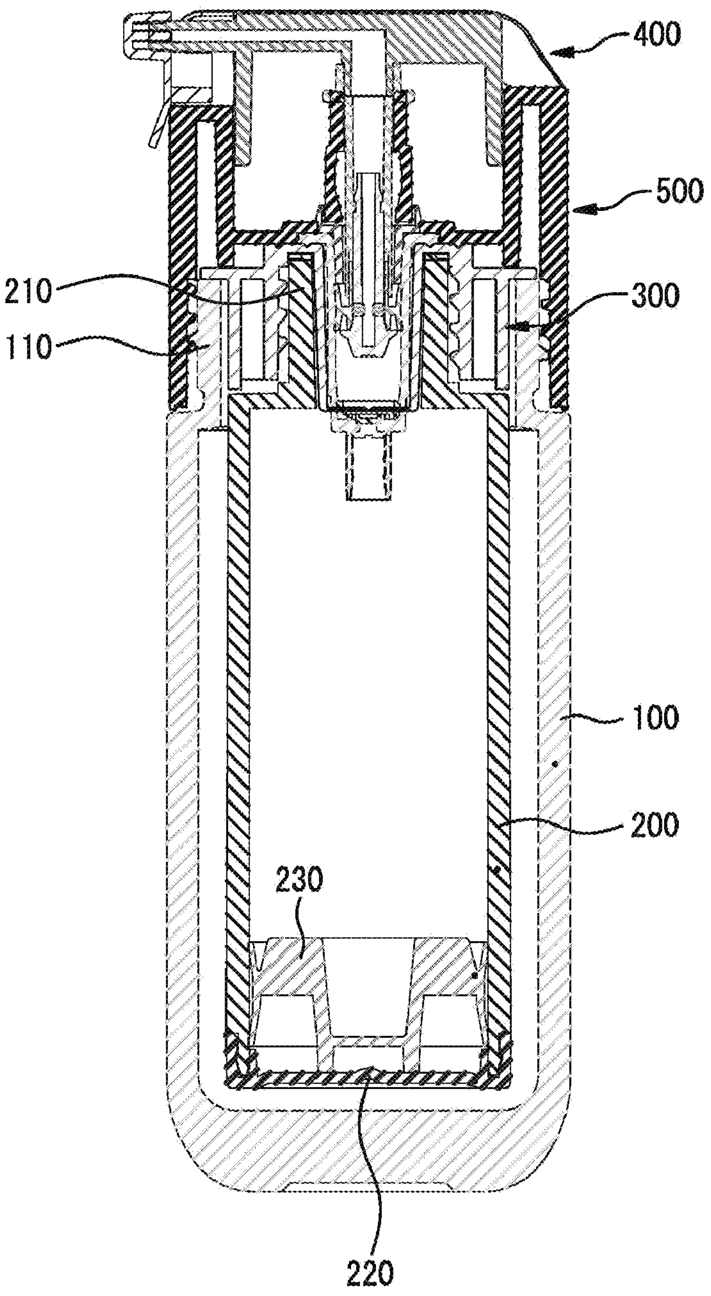
FIG. 6 is a cross-sectional view of a double container according to another embodiment of the present invention.

Meanwhile, FIG. 6 is a cross-sectional view of a double container according to another embodiment of the present invention.

Referring to FIG. 6, the container cap 500 is formed in a shape that extends upwards so as to cover outer circumference of the push button 440.

The embodiments of the present invention described above are merely exemplary, and those skilled in the art to which the present invention belongs will readily appreciate that various modifications and equivalent other embodiments can be made.

Therefore, it can be well understood that the present invention is not limited to the forms mentioned in the detailed description above.

Therefore, the true technical protection scope of the present invention should be determined by the technical idea of the appended claims, and the present invention should be understood to include the technical idea defined by the appended claims and all modifications, equivalents and substitutes within the scope.

INDUSTRIAL APPLICABILITY

According to the present invention implemented with the above-described solution, there is an effect that can help in environmental conservation because a separate inner container lid or sealing paper is not discharged.

What is claimed is:

1. A pump cap for a double container, which includes an outer container having an outer neck part, an inner container accommodated inside the outer container through the outer neck part of the outer container and having an inner neck part, a pump cap detachably fitted into the inner neck part of the inner container, a discharge pump coupled to the pump cap and having a piston housing for discharging liquid contents stored in the inner container, and a container cap for fixing the discharge pump and the inner container to the outer container, characterized in that the pump cap comprises:

- a guide bushing detachably fitted into inner circumference of the inner neck part of the inner container so as to guide coupling of the piston housing;
- a coupling sleeve spaced apart from outer diameter of the guide bushing at a predetermined interval so as to be detachably coupled to outer circumference of the inner neck part of the inner container;
- a cap flange for connecting the coupling sleeve and an upper end of the guide bushing; and
- a shoulder brim extending along periphery of the cap flange so as to be placed on an upper end of the outer neck part of the outer container.

2. The pump cap for a double container according to claim 1, wherein the discharge pump comprises:

- the piston housing having a disc coupled to inner circumference of the guide bushing so as to control flow of the liquid contents stored in the inner container;
- a pump piston coupled to inner circumference of the piston housing so as to move up and down;
- a valve coupled to the pump piston so as to discharge the liquid contents introduced through the disc;
- a push button having a nozzle so as to discharge the liquid contents by pressing the valve; and
- a spring for restoring the push button, and wherein a pricker is provided on a lower surface of the piston housing so as to prick and release a sealing part that seals a lower end of the guide bushing.

3. The pump cap for a double container according to claim 1, wherein a space ring is provided on edge of a lower surface of the cap flange so as to maintain a coupling gap for inner circumference of the outer neck part of the outer container.

* * * * *